Dec. 27, 1960  F. H. REDER  2,966,341
NITROGEN TRAPS FOR MOLECULAR RESONANCE DEVICES
Filed May 14, 1958

INVENTOR,
FRIEDRICH H. REDER.
BY
Harry M. Saragovitz
ATTORNEY.

United States Patent Office 2,966,341
Patented Dec. 27, 1960

2,966,341

NITROGEN TRAPS FOR MOLECULAR RESONANCE DEVICES

Friedrich H. Reder, Long Branch, N.J., assignor to the United States of America as represented by the Secretary of the Army Filed May 14, 1958, Ser. No. 735,342

4 Claims. (Cl. 257—263)

(Granted under Title 35, U.S. Code (1952), sec. 266)

The invention described herein may be manufactured and used by or for the Government for governmental purposes, without the payment of any royalty thereon.

This invention relates to focusers for molecular resonance devices in which oscillations are generated during transitions to lower energy states of molecular particles. One device of this type is known as the Maser.

In the Maser, a stream of ammonia gas is passed through a focuser which separates out the molecules of lower energy state and concentrates those of higher energy state into a beam. This beam is passed into a cavity resonator where, during transitions of the molecules to lower energy states, oscillations of characteristic frequencies, called transition frequencies, are radiated. The resonator is tuned to one of these frequencies, so that the latter is sustained.

The molecules in the low energy state are deflected by the focuser and thus are separated from the molecular beam entering the cavity. To remove the deflected particles, the focuser structure is maintained at a low temperature so that the deflected gas molecules are condensed. This has heretofore been done by using a four-pole focuser made up of hollow rods filled with liquid nitrogen, or by using a hollow cylindrical jacket surrounding the focuser and filled with liquid nitrogen. Such devices are called cold traps or nitrogen traps.

However, the first of the above expedients poses difficult insulation problems and cannot be used at all where a great number of focuser poles are involved. The second expedient is clumsy and requires too much leak-proof welding. Neither expedient can be used in compact portable equipment.

It is a principal object of the invention to provide a simple and effective liquid nitrogen trap for focusers which eliminates the difficulties above mentioned.

In accordance with the invention, a single tube of liquid nitrogen is positioned at one side of the focuser. Extending from this tube and surrounding the focuser is a metal sheet or a disk assembly which also surrounds the focuser. The liquid nitrogen container cools the metal sheet or disk assembly extending therefrom and this, in turn, maintains the focuser at a low temperature. This expedient is simple to install and maintain, requires a minimum of welding, and has proven very effective.

For a better understanding of the invention, together with other and further objects thereof, reference is had to the following description taken in connection with the accompanying drawing, in which.

Figure 1:
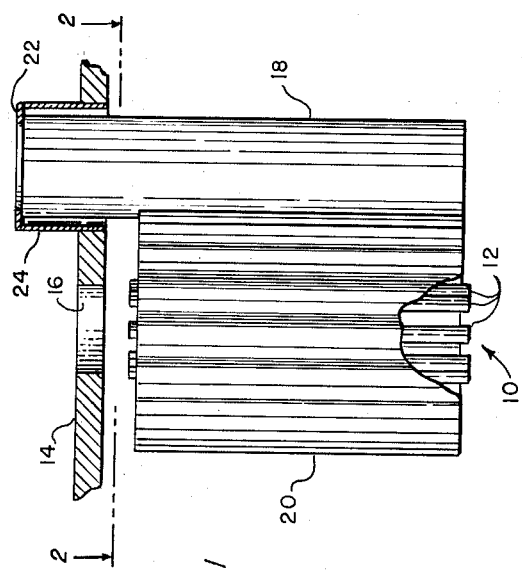
Fig. 1 is a longitudinal elevation of one embodiment of the invention.
Figure 2:
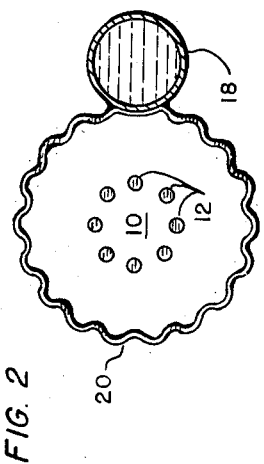
Fig. 2 is a plan view taken along lines 2—2 of Fig. 1.

In Figs. 1 and 2 there is shown a conventional Stark focuser 10 of a Maser. It comprises eight rods 12, evenly spaced around a circle to form a cylindrical enclosure. By means not shown, the focuser rods are supported in the vicinity of a panel 14 having an aperture 16, through which a stream of ammonia gas is passed into the focuser. A cavity resonator, not shown, is positioned at the other end of the focuser and has an opening therein through which the focused beam of molecules are admitted.

For cooling the focuser structure, there is used a cylindrical stainless steel container 18, positioned at one side of the focuser structure 10 and fastened at its upper end to panel 14. This container is filled with liquid nitrogen. To transmit the cooling effect to the focuser, there is soldered to one side of the container a copper tube having a corrugated surface to increase the cooling area. This sheet completely surrounds the focuser structure and maintains it uniformly cool.

The top of cylinder 18 extends through an aperture in panel 16 and is fastened to the sides of said aperture in a manner to provide greater heat insulation. To this end, cylinder 18 has a circular flange 22 welded thereto, and this flange is, in turn, welded to the top of a tube 24 welded to the cylinder. Screwed to disk 38 by means a longer heat conducting path is provided between the liquid nitrogen container 18 and panel 14.

Figure 3:
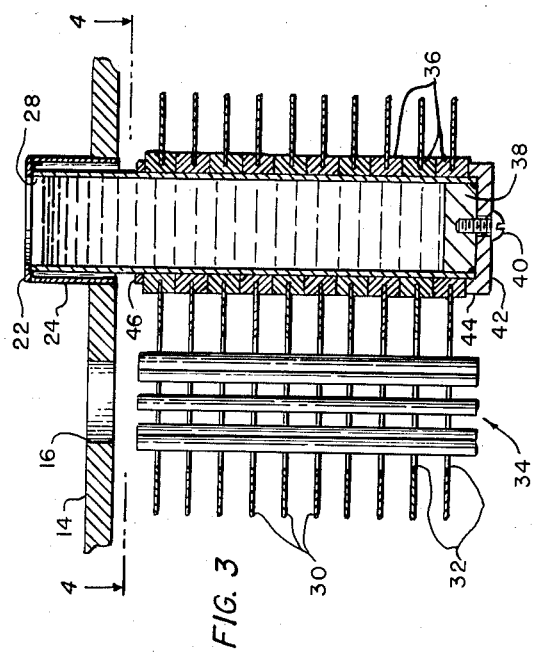
Fig. 3 is a longitudinal section of another embodiment of the invention.
Figure 4:
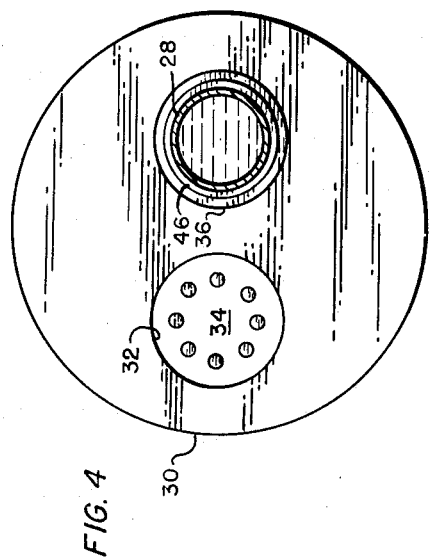
Fig. 4 is a plan view taken along lines 4—4 of Fig. 3.

In the embodiment illustrated in Figs. 3 and 4, the nitrogen-filled cylindrical container 28 has a number of copper fins 30 in the form of disks extending laterally therefrom. The disks have aligned apertures 32 forming an enclosure through which the rods of focuser 34 extend. Each disk is circular and is mounted on an eccentrically-disposed ring spacer of greater thickness than the disk to provide a desired amount of spacing between the disks. The inner diameter of each ring is such that it fits snugly around the cylinder 28.

The bottom of container 28 is formed by a disk 38 welded to the cylinder. Screwed to disk 38 by means of a screw 40 is a disk-shaped cap 42, which has a peripheral, upwardly-extending rim 44 which abuts against the lowermost ring 36 and thus holds the disc assembly tightly against a peripheral ring abutment 46 welded on the outside of cylinder 28. To prevent the disks from turning, cylinder 28 is provided with a longitudinal rib or key (not shown) which fit into aligned longitudinal slots (not shown) in rings 36. Any other known means to prevent rotation can be used.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a molecular resonance device having a supporting structure and a Stark type focuser, a cooling means spaced laterally therefrom and parallel therewith comprising a metallic container of cooling fluid, antiheat conducting securing means to support said cooling means upon said supporting structure, metallic heat conducting means secured in close heat coupling relation to said container and extending laterally to and embracing the full length of said focuser whereby said antiheat conducting support will reduce heat exchange between said container of cooling fluid and said supporting structure thus to confine major heat exchange paths to said metallic heat conducting means and effectively conduct heat from the atmosphere surrounding the focuser.

2. A molecular resonance device according to claim 1 and wherein said heat conducting means comprises a plurality of metallic fins in close heat coupling relation to the said container and having aligned apertures thru which said focuser extends.

3. A molecular resonance device according to claim 1 and wherein the said heat conducting means comprises a hollow metallic cylinder having close heat coupling relation to said fluid container and embracing said focuser.

4. A molecular resonance device according to claim 1 and wherein said heat conducting means comprises spaced parallel metallic discs having close heat coupling relation to said fluid container, the discs having aligned apertures thru which said focuser extends without contacting the said discs.

References Cited in the file of this patent

UNITED STATES PATENTS

| | | |
|---|---|---|
| 2,019,759 | McNeil | Nov. 5, 1935 |
| 2,065,873 | Ruff | Dec. 29, 1936 |
| 2,067,325 | Jones et al. | Jan. 12, 1937 |
| 2,395,757 | Peters | Feb. 26, 1946 |
| 2,617,057 | Reiniger | Nov. 4, 1952 |
| 2,650,801 | Collito | Sept. 1, 1953 |
| 2,681,797 | Van Vliet | June 22, 1954 |
| 2,800,605 | Marchese | July 23, 1957 |
| 2,802,345 | Jonkers et al. | Aug. 13, 1957 |
| 2,833,370 | Sherwood | May 6, 1958 |
| 2,838,711 | Crowley-Milling | June 10, 1958 |
| 2,851,652 | Dicke | Sept. 9, 1958 |